United States Patent
Slama et al.

(10) Patent No.: US 11,539,224 B2
(45) Date of Patent: Dec. 27, 2022

(54) DROP-IN CHARGING SYSTEM FOR ELECTRIC AEROSOL-GENERATING DEVICES

(71) Applicant: PHILIP MORRIS PRODUCTS S.A., Neuchâtel (CH)

(72) Inventors: Philippe Slama, Pully (CH); Florent Cuchet, Stockholm (SE); Norman Andrew Stevenson, Dublin (IE); Kyungil Chung, Glenageary (CH); Peter Joseph Bevan, Greystones (IE); Michael Nolan, Lucan (IE); James Robert Lynch, Dublin (IE)

(73) Assignee: Philip Morris Products S.A., Neuchâtel (CH)

( * ) Notice: Subject to any disclaimer, the term of this patent is extended or adjusted under 35 U.S.C. 154(b) by 69 days.

(21) Appl. No.: 17/049,843

(22) PCT Filed: Apr. 22, 2019

(86) PCT No.: PCT/IB2019/053310
§ 371 (c)(1),
(2) Date: Oct. 22, 2020

(87) PCT Pub. No.: WO2019/207461
PCT Pub. Date: Oct. 31, 2019

(65) Prior Publication Data
US 2021/0052009 A1    Feb. 25, 2021

(30) Foreign Application Priority Data
Apr. 23, 2018   (EP) .................................... 18168808

(51) Int. Cl.
*H02J 7/00*    (2006.01)
*A24F 40/90*   (2020.01)
*H02J 50/10*   (2016.01)

(52) U.S. Cl.
CPC ............ *H02J 7/0044* (2013.01); *A24F 40/90* (2020.01); *H02J 50/10* (2016.02)

(58) Field of Classification Search
CPC ........ H02J 7/0027; H02J 7/0044; H02J 50/10; A24F 40/90
(Continued)

(56) References Cited

U.S. PATENT DOCUMENTS 7,293,565 B2 * 11/2007 Griffin .................. H02J 7/0044
                                                           131/329
8,695,794 B2 *  4/2014 Scatterday .............. A24F 15/01
                                                           206/242
(Continued)

FOREIGN PATENT DOCUMENTS

CN       205624471 U   10/2016
EP        2432339 A1    3/2012
(Continued)

OTHER PUBLICATIONS

International Search Report and Written Opinion for PCT/IB2019/053310 by the European Patent Office dated Nov. 9, 2019; 10 pgs.
(Continued)

*Primary Examiner* — Peter G Leigh
(74) *Attorney, Agent, or Firm* — Mueting Raasch Group

(57) ABSTRACT

A charging system (10) for an aerosol-generating device (12) includes a charging unit (14). The charging unit includes a body (20) at least partially defining a receiving volume (22). The receiving volume is sized to receive the elongate aerosol-generating device through an open top end in a plurality of orientations. A charging interface is coupled to the body and includes a biasing element and an electrical contact. The biasing element is configured to apply a force on the aerosol-generating device that causes an electrical contact of the aerosol-generating device to electrically
(Continued)

engage the electrical contact of the charging interface when the aerosol-generating device rests on the charging unit.

15 Claims, 6 Drawing Sheets

(58) Field of Classification Search
USPC .......................................................... 131/329
See application file for complete search history.

(56) References Cited

U.S. PATENT DOCUMENTS

| | | | |
|---|---|---|---|
| 8,729,854 B2 | 5/2014 | Tsai et al. | |
| 8,928,277 B2 | 1/2015 | Xiang et al. | |
| 9,647,483 B1* | 5/2017 | Bana | H01F 38/14 |
| 9,901,117 B2* | 2/2018 | Levitz | H02P 27/085 |
| 9,906,056 B2* | 2/2018 | Liu | H02J 7/00 |
| 9,936,733 B2* | 4/2018 | Ampolini | H02J 7/00 |
| 9,947,483 B2 | 4/2018 | Okada et al. | |
| 10,010,114 B2* | 7/2018 | Jordan | H02J 7/00 |
| 2014/0174968 A1* | 6/2014 | Scatterday | A24F 15/01 |
| | | | 206/265 |
| 2014/0224267 A1 | 8/2014 | Levitz et al. | |
| 2016/0374395 A1* | 12/2016 | Jordan | H02J 7/0044 |
| | | | 131/329 |
| 2018/0248393 A1* | 8/2018 | Sun | H02J 7/0045 |
| 2018/0279687 A1* | 10/2018 | Jordan | H02J 7/0044 |

FOREIGN PATENT DOCUMENTS

| | | | | |
|---|---|---|---|---|
| JP | 2002084664 A | | 3/2002 | |
| KR | 101498779 B1 * | | 3/2015 | ............ A24F 40/40 |
| RU | 2531890 C2 | | 10/2014 | |
| RU | 2617297 C2 | | 4/2017 | |
| RU | 2620751 C2 | | 5/2017 | |
| WO | WO 2010/133342 A1 | | 11/2010 | |
| WO | WO 2013/093695 A1 | | 6/2013 | |
| WO | WO 2013/102611 A2 | | 7/2013 | |
| WO | WO 2018/202730 A1 | | 11/2018 | |

OTHER PUBLICATIONS

European Search Report for EP 18168808.6 issued by the European Patent Office dated Nov. 16, 2018; 5 pgs.

International Preliminary Report on Patentability for PCT/IB2019/053310 issued by the International Bureau of WIPO; dated Oct. 27, 2020; 6 pgs.

Russian Office Action for RU Application No. 2020138024, issued by the Patent Office of the Russian Federation dated Jul. 27, 2022; 13 pgs. including English translation.

* cited by examiner

DROP-IN CHARGING SYSTEM FOR ELECTRIC AEROSOL-GENERATING DEVICES

This application is the § 371 U.S. National Stage of International Application No. PCT/IB2019/053310, filed 22 Apr. 2019, which claims the benefit of European Application No. 18168808.6, filed 23 Apr. 2018.

The present disclosure relates to charging for electric aerosol-generating devices. In particular, the present disclosure relates to a drop-in charging system for electric aerosol-generating devices using a biasing element and an electrical contact.

Electrically operated aerosol-generating devices generally comprise an aerosol-forming substrate and an atomiser, which is operated to atomise the aerosol-forming substrate to form an aerosol for inhalation by a user. Typically, electrically operated aerosol-generating devices also comprise an aerosol-generating device comprising an electrical power supply for supplying power to the atomiser. The atomiser may be an electric heater.

In some systems, the aerosol-generating device is configured to receive an aerosol generating article comprising a solid aerosol-forming substrate, such as a gathered, crimped sheet of tobacco. In these systems, the device typically comprises the atomiser, which is arranged to heat the aerosol-forming substrate when the article is received in the device. The article may also comprise a filter, which is wrapped together with the aerosol-forming substrate in the form of a rod, similar to a conventional cigarette. In other systems, the device is configured to receive a cartridge comprising the atomiser and a liquid aerosol-forming substrate. Such cartridges are often referred to as cartomizers. Common types of atomiser used in cartomizers comprises a coil of heater wire wound around an elongate wick soaked in liquid aerosol-forming substrate.

Some electrically operated aerosol-generating devices include a charging unit for recharging the electrical power supply of the electrically operated aerosol-generating device.

The charging unit may comprise a body, a rechargeable electrical power supply housed in the body, and a cavity for receiving the electrically operated aerosol-generating device. Typically, the aerosol-generating device must be aligned coaxially with the cavity to insert the aerosol-generating device for charging. Some charging units even require a specific rotational orientation of the aerosol-generating device relative to the charging unit.

It would be desirable to improve the speed and ease with which a user is able to electrically connect an aerosol-generating device and a charging unit. It would further be desirable to provide means to improve the electrical connection between an aerosol-generating device and a charging unit. It would also be desirable to provide an entertaining and visually appealing means of charging the aerosol-generating device in the charging unit.

Various aspects of the disclosure relate to a charging system usable with an aerosol-generating device or any other portable device. The charging system may include a charging unit defining a receiving volume and a charging interface. The charging system may be configured to automatically reposition an aerosol-generating device that is dropped into the receiving volume for charging with the charging interface. As a result, an elongate aerosol-generating device may be inserted into the receiving volume in a plurality of orientations to facilitate ease of charging.

In one aspect of the disclosure, a charging system for an aerosol-generating device comprises a body at least partially defining a receiving volume. The receiving volume tapers along a longitudinal axis from an open top end portion to a bottom end portion. The receiving volume is sized to receive an elongate aerosol-generating device through the open top end in a plurality of orientations. The body is configured to cause the elongate aerosol-generating device to rest at a predefined tilt relative to the longitudinal axis. The charging system also includes a charging interface coupled to the body comprising a first biasing element and a first electrical contact. The first biasing element is configured to apply a force on a second biasing element of the aerosol-generating device that causes a second electrical contact of the aerosol-generating device to electrically engage the first electrical contact when the aerosol-generating device rests on the body at the predefined tilt.

In one or more aspects, the first biasing element is configured to attract the second biasing element of the aerosol-generating device.

In one or more aspects, the first biasing element is configured to cause the aerosol-generating device to rest in a predefined radial direction that aligns the first electrical contact with the second electrical contact.

In one or more aspects, the charging interface further comprises a third biasing element configured to repel the second biasing element of the aerosol-generating device.

In one or more aspects, the charging interface defines a surface of the bottom end portion of the body. The charging interface comprises a first radial side portion including the first biasing element and a second radial side portion including the third biasing element.

In one or more aspects, at least one of the first biasing element and the third biasing element has an annular shape.

In one or more aspects, the first electrical contact comprises a pogo pin.

In one or more aspects, the charging interface is coupled to the bottom end portion of the body.

In one or more aspects, the biasing elements comprise magnets.

In one or more aspects, the body is configured to cause the aerosol-generating device to rest in a predefined radial direction that aligns the first electrical contact with the second electrical contact.

In one or more aspects, the bottom end portion of the body defines a surface that is not orthogonal to the longitudinal axis.

In one or more aspects, the bottom end portion of the body comprises a conical shape.

In one or more aspects, a visual indicator that activates in response to the first electrical contact electrically engaging the second electrical contact.

In one or more aspects, the charging system further comprises the aerosol-generating device having the second electrical contact and the second biasing element. The second electrical contact is configured to electrically engage with the first electrical contact in any rotational orientation.

In one or more aspects, the charging system further comprises the aerosol-generating device having the second electrical contact and the second biasing element. The second electrical contact is not aligned to a central axis extending along the elongate aerosol-generating device.

Advantageously, one or more charging systems described herein may enable a user to "throw" an aerosol-generating device into a receiving volume of a charging unit at a variety of orientations instead of needing to carefully align the aerosol-generating device with a charging unit cavity. The use of biasing units may improve the electrical connection between the charging unit and an aerosol-generating device disposed in the charging unit at a predefined tilt. Due to biasing forces that automatically orient the aerosol-generating device after being dropped into the charging unit, the interaction of the aerosol-generating device and the charging unit may be described as playful and may entertain the user. Further, the charging unit body and the aerosol-generating device may be designed for pleasing aesthetics suitable for use as decoration in a home or office setting. Other advantages and benefits will become apparent to one skilled in the art having the benefit of this disclosure.

All scientific and technical terms used herein have meanings commonly used in the art unless otherwise specified. The definitions provided herein are to facilitate understanding of certain terms used frequently herein.

The term "aerosol-generating device" refers to a device configured to use an aerosol-forming substrate to generate aerosol. In some embodiments, the aerosol-generating device may be described as a smoking article or a holder, particularly a tobacco stick holder. Preferably, the aerosol-generating device also includes an aerosolizer. The aerosolizer may include an atomizer, cartomizer, heater, or other aerosolizing components.

The term "aerosol-forming substrate" refers to a device or substrate that releases, upon heating, volatile compounds that may form an aerosol to be inhaled by a user. Suitable aerosol-forming substrates may include plant-based material. For example, the aerosol-forming substrate may include tobacco or a tobacco-containing material containing volatile tobacco flavour compounds, which are released from the aerosol-forming substrate upon heating. In addition, or alternatively, an aerosol-forming substrate may include a non-tobacco containing material. The aerosol-forming substrate may include homogenized plant-based material. The aerosol-forming substrate may include at least one aerosol former. The aerosol-forming substrate may include other additives and ingredients such as flavourants. In some embodiments, the aerosol-forming substrate comprises a liquid at room temperature. For example, the aerosol-forming substrate may comprise a liquid solution, suspension, dispersion or the like. In some embodiments, the aerosol-forming substrate comprises a solid at room temperature. For example, the aerosol-forming substrate may comprise tobacco or sugar. Preferably, the aerosol-forming substrate comprises nicotine.

The term "tobacco material" refers to a material or substance comprising tobacco, which comprises tobacco blends or flavoured tobacco, for example.

As used herein, the term "aerosol" is used when discussing a flow of aerosol, may refer to aerosol, air containing aerosol or vapour, or aerosol-entrained air.

The term "tilt" is used to describe an orientation of the elongate aerosol-generating device and, in particular, refers to an angle between a longitudinal axis defined by the charging unit and a central axis defined by the elongate aerosol-generating device.

The term "radial" is used to describe an orientation orthogonal to an axis. For example, an element may extend radially outward from the axis or may extend radially around the axis. The term "radial direction" may be used to describe an orientation of the elongate aerosol-generating device and, in particular, may refer to a radial direction that the device is tilting or leaning relative to the longitudinal axis defined by the charging unit. In other words, a radial direction may be aligned to a plane that intersects both the axis defined by the charging unit and the central axis of the elongate aerosol-generating device. In some cases, the term "lateral" may be used interchangeably with the term radial.

The term "rotational orientation" is used to describe an orientation of the elongate aerosol-generating device and, in particular, refers to an orientation about the central axis of the aerosol-generating device. In other words, turning the aerosol-generating device about the central axis changes the rotational orientation of the device.

Having defined certain frequently-used terms above, the charging system of this disclosure will be described herein in more detail. In general, a charging system includes a charging unit defining a receiving volume and a charging interface. An elongate aerosol-generating device may be inserted for "dropped" into the receiving volume in a plurality of orientations and automatically repositioned from an initial position to a charging position. The device may come to rest in the charging position. In some embodiments, the charging unit biases the aerosol-generating device to a predefined tilt to electrically engage the device with the charging unit.

The charging system may be used with any suitable aerosol-generating device or other portable device. The aerosol-generating device may include one or more housings. The aerosol-generating device may include a battery contained within the housing.

The aerosol-generating device may include an aerosol-generating element, which may be described as an aerosolizer. The aerosolizer may be contained by the housing. The aerosolizer may be configured to produce aerosol from an aerosol-forming substrate.

Any suitable type of aerosolizer may be used. In some cases, the aerosolizer may be thermally or fluidly coupled to the aerosol-forming substrate. The aerosolizer may be compatible for use with various types of aerosol-forming substrates.

The aerosolizer may include a heating blade for use with a solid aerosol-forming substrate. The heating blade may be coupled to the housing of the aerosol-generating device to receive electrical power from a power source (battery). For example, the aerosol-forming substrate may be provided in the form of a heat stick. The heating blade may be inserted into the heat stick and heated to produce aerosol from the solid substrate. The solid substrate may be a smoking material, such as tobacco. The heat provided by the heating blade to the heat stick may not burn the smoking material.

The aerosolizer may include a heater, a heater coil, a chemical heat source (such as a carbon heat source), or any suitable means that heats the substrate to generate aerosol. The aerosolizer may be coupled to the housing of the aerosol-generating device to receive electrical power from a power source (battery) and may be disposed adjacent to the substrate. For example, a heating element of a heater may be disposed adjacent to the aerosol-forming substrate and heated to produce aerosol from a liquid or solid substrate. A heater coil may include a susceptor adjacent to the aerosol-forming substrate and when an energized inductive coil is disposed adjacent to the susceptor, electromagnetic energy may be transferred to the susceptor to heat the substrate.

The aerosolizer may include an atomizer. A liquid aerosol-forming substrate may be contained in the substrate housing and in fluid communication with the atomizer. The atomizer may mechanically generate aerosol from the liquid substrate instead of relying only on temperature.

The aerosolizer may be compatible for use with an aerosol-forming substrate having a nicotine source and a lactic acid source. The nicotine source may include a sorption element, such as a PTFE wick with nicotine adsorbed thereon, which may be inserted into a chamber forming a first compartment. The lactic acid source may include a sorption element, such as a PTFE wick, with lactic acid adsorbed thereon, which may be inserted into a chamber forming a second compartment. The aerosolizer may include a heater to heat both the nicotine source and the lactic acid source. Then, the nicotine vapor may react with the lactic acid vapor in the gas phase to form an aerosol.

The aerosolizer may be compatible for use with an aerosol-forming substrate having a capsule that contains nicotine particles and disposed in a cavity. During a user's inhalation, the air flow may rotate the capsule. The rotation may suspend and aerosolize the nicotine particles.

The aerosol-forming substrate is at least partially disposed in the aerosol-generating device when used. The aerosol-forming substrate may be removable after being consumed. A new aerosol-forming substrate may be received by the aerosol-generating device to replace the consumed substrate.

The aerosol-generating device may include a controller. The controller may be operatively coupled to the aerosolizer. The controller of the aerosol-generating device may be contained by the housing of the aerosol-generating device. The controller is configured to activate the aerosolizer to produce aerosol from the aerosol-forming substrate. The aerosolizer may be activated to produce aerosol according to an aerosol delivery profile.

The aerosol-generating device may include a communication interface. The communication interface may be any suitable interface, wired or wireless, configured to communicate data between devices, such as universal serial bus (USB), micro USB, powerline, Wi-Fi, Bluetooth, and cellular data networks. One or more controllers may include memory. The memory may be used to store various types of data. Stored data may be later used, displayed, or communicated from the aerosol-generating device.

Various devices may be connected to the communication interface or removed over time. The communication interface may be configured to receive data from other devices. Such received data may be provided to the user, for example, using a user interface of the aerosol-generating device.

The aerosol-generating device may also include one or more user interfaces. In some embodiments, a display or a speaker is operatively coupled to one or more of the controllers. The display may be configured, for example, to display graphics. Graphics may include alphanumerical characters or other images.

The aerosol-generating device may include an elongate body. The elongate body may include or define an end portion, such as a proximal end portion or a distal end portion. The elongate body may extend along a central axis that intersects the proximal end portion and the distal end portion.

A charging interface may be included with the aerosol-generating device to connect to the charging unit for charging the battery. The charging interface may use contact charging to interface with the charging unit. In particular, electrical contacts on the charging interface may electrically engage the charging unit.

The charging interface of the aerosol-generating device may be coupled to the elongate body. The charging interface may be positioned on one or more end portions of the aerosol-generating device. In particular, the charging interface may be positioned on at least the distal end portion.

The charging interface of the aerosol-generating device includes at least one electrical contact. The electrical contact may be exposed on an exterior of the elongate body. The electrical contact may be used to charge the battery of the aerosol-generating device. In particular, the contact may electrically engage a contact of the charging unit to electrically couple the device to the charging unit. In addition, the charging interface may include another electrical contact, which may be used as a ground or an electrical return for charging.

One or more electrical contacts described herein may be formed of any suitable electrical conductor. In some embodiments, one or more electrical contacts are formed of copper.

The charging interface may include at least one biasing element. The biasing element may be used to orient the aerosol-generating device with respect to the charging unit. For example, the biasing element may include a magnet that may attract or repel at least a portion of the charging unit.

The charging unit includes a charging interface that is complementary to the charging interface of the aerosol-generating device. When the charging interfaces of the aerosol-generating device and charging unit are engaged, the aerosol-generating device may be recharged with the charging unit. The charging system may be configured to automatically reposition the aerosol-generating device into a charging position from a variety of orientations when the aerosol-generating device is received in the charging unit. In particular, the charging system may be configured to automatically reposition, move, or encourage the aerosol-generating device into a tilted position, a predefined radial direction, a rotational orientation, or a combination thereof for charging.

The charging interface of the charging unit includes at least one electrical contact. The electrical contact may be used to electrically engage a contact of the aerosol-generating device to charge the battery of the device. In addition, the charging interface of the charging unit may include another electrical contact, which may be used as a ground or an electrical return for charging.

The charging interface of the charging unit may include at least one biasing element, the biasing element may be used to orient the aerosol-generating device relative to the charging unit. For example, the biasing element may include a magnet that may attract or repel at least a portion of the aerosol-generating device.

In some embodiments, the charging interface of the charging unit may comprise a first biasing element and a first electrical contact. The first biasing element may be configured to apply a force on the aerosol-generating device, which may cause the aerosol-generating device to electrically engage the first electrical contact. In some embodiments, the first biasing element may apply the force on a biasing element of the aerosol-generating device (second biasing element), which may cause an electrical contact of the aerosol-generating device (second electrical contact) to electrically engage the first electrical contact. The first biasing element may be configured to attract the second biasing element of the aerosol-generating device. In some embodiments, the second electrical contact is configured to electrically engage with the first electrical contact in any rotational orientation. In other words, the aerosol-generating device may electrically engage the charging unit for charging, using the second electrical contact, in some or all rotational orientations about the central axis of the aerosol-generating device.

The second electrical contact may be offset from the central axis extending along the aerosol-generating device. In other words, the second electrical contact may not be aligned to the central axis. The centre of the second electrical contact may not be aligned to the central axis of the elongate aerosol-generating device. For example, the second electrical contact may be positioned on the distal end portion of the aerosol-generating device closer to a first side than a second side the device in a lateral or radial direction.

The charging interface of the charging unit may include another biasing element (third biasing element). In some embodiments, the third biasing element is configured to apply an opposite force upon the aerosol-generating device than the first biasing element. The third biasing element may be described as having an opposite polarity than the first biasing element. The third biasing element may be configured to repel, whereas the first biasing element may be configured to attract, the second biasing element of the aerosol-generating device.

The second biasing element of the aerosol-generating device may be used in conjunction with the first biasing element, the third biasing element, or both the first and third biasing elements. In some embodiments, the second biasing element may be used to attract the first biasing element and to repel the third biasing element.

In some embodiments, the second biasing element may be offset from the central axis of the aerosol-generating device. When the second biasing element is not aligned to the central axis, the second biasing element may be used to reposition the aerosol-generating device into a particular rotational orientation for charging.

One or more biasing elements of the charging system may include material having a magnetic property, such as ferromagnetism. One or more biasing elements of the charging system may comprise a permanent magnet. For example, the first biasing element may include a magnet, which may provide an attracting force (or repulsing force) on one or more biasing elements of the aerosol-generating device.

The first biasing element may be disposed proximate to the first electrical contact of the charging unit. The second biasing element may be positioned proximate to the second electrical contact of the aerosol-generating device.

In some embodiments, the first biasing element may at least partially surround the first or third electrical contact. In particular, the first biasing element may at least partially surround an exposed surface of the first or third electrical contact, which may facilitate even contact with the electrical contact of the aerosol-generating device (second electrical contact) around a periphery of the first or third electrical contact. In some embodiments, the first biasing element at least partially forms a ring radially around, or at least partially surrounding, the first or third electrical contact.

One or more biasing elements or electrical contacts may have an annular shape. For example, the first biasing element, the third biasing element, or both the first and third biasing elements have an annular shape. The annular shape may be defined by an arc that extends radially at least partially around, or at least partially surrounding, the longitudinal axis of the charging unit.

In addition to the first electrical contact, the charging interface of the charging unit may include another electrical contact (third electrical contact). For example, the charging interface of the charging unit may include the first electrical contact and the third electrical contact. The third electrical contact may be used in charging. For example, the third electrical contact may provide an electrical return path for current provided using the first electrical contact.

The first electrical contact may at least partially surround the third electrical contact, or vice versa. In particular, the first electrical contact may at least partially surround an exposed surface of the third electrical contact. In some embodiments, the first electrical contact at least partially forms a ring radially around, or at least partially surrounding, the third electrical contact.

The first electrical contact may at least partially cover the first biasing element. The first electrical contact may be positioned proximal to the first biasing element. In other words, the first electrical contact may be positioned between the first biasing element and the aerosol-generating device when the device rests in, or is supported by, the charging unit. In some embodiments, the first electrical contact may be described as coaxially aligned to the first biasing element.

In addition to the second electrical contact, the charging interface of the aerosol-generating device may include another electrical contact (fourth electrical contact). For example, the charging interface of the aerosol-generating device may include the second electrical contact and the fourth electrical contact. The fourth electrical contact may be used in charging. For example, the fourth electrical contact may electrically engage the third electrical contact of the charging unit to provide an electrical return path for current provided using the first electrical contact.

The second electrical contact may at least partially surround the fourth electrical contact, or vice versa. In particular, the second electrical contact may at least partially surround an exposed surface of the fourth electrical contact. In some embodiments, the second electrical contact at least partially forms a ring radially around, or at least partially surrounding, the fourth electrical contact.

The second electrical contact may at least partially cover the second biasing element. The second electrical contact may be positioned distal to the second biasing element. In other words, the second electrical contact may be positioned between the second biasing element and the charging unit when the aerosol-generating device rests in the charging unit. In some embodiments, the second electrical contact may be described as coaxially aligned to the second biasing element.

One or more electrical contacts may include a spring element, which may be used to facilitate engagement between electrical contacts. In particular, the spring element may include a pogo pin. For example, in some embodiments, the first electrical contact may comprise a pogo pin. The pogo pin may be at least partially surrounded radially by the first biasing element.

In some embodiments, one or more biasing elements may be formed as cylindrical tubes or rings. For example, the first and second biasing elements may be formed as cylindrical tubes. One or more of the biasing elements may function as one or more of the electrical contacts or as an electrode. For example, each of the first and second biasing elements may be electrically coupled to an electrical ground. One or more of the electrical contacts may pass through the cylindrical magnet tubes. For example, the first electrical contact formed as a pogo pin may pass through the cylindrical magnet tubes of the first and second biasing elements.

In some embodiments, the biasing elements of the charging interfaces may be described as forming retaining means (such as, magnetic retaining means) for releasably retaining electrical engagement between the aerosol-generating device and the charging unit, when an aerosol-generating device is received in the charging unit. The magnetic retention means may include a first magnetic material at the distal end portion of the aerosol-generating device and a second magnetic material at a bottom end portion of the charging unit.

The aerosol-generating device may include a first connector (charging interface) at a distal end face of the distal end portion of the aerosol-generating device. The first connector may include the second electrical contact, the fourth electrical contact, or both the second and fourth electrical contacts. The first magnetic material may include a ring of ferromagnetic material arranged proximally of the first connector (second biasing element). The ring may substantially circumscribe a recess of the first connector and may be electrically isolated from the first connector.

The charging unit may include a second connector (charging interface) at a closed end face of the bottom end portion of the charging unit. The second connector may include the first electrical contact, the third electrical contact, or both the first and third electrical contacts. The second magnetic material may include a substantially tubular magnetic structure (first biasing element). The second magnetic material may be arranged beneath the second connector and may be electrically isolated from the second connector.

In general, the second magnetic material may include two rings of ferromagnetic material that are aligned such that an unobstructed cylindrical passage is provided through the rings. The rings may be spaced apart along the axis of the cylindrical passage and may be separated by two permanent magnets. The two permanent magnets may be substantially identical, and each magnet may form a substantially semi-circular arc having a radius substantially equal to the radius of the rings. The permanent magnets may be arranged to generally circumscribe the cylindrical passage on opposite sides of the central passage. The magnetic north-south polarities of the permanent magnets may be oriented in the same direction. In this arrangement, the second magnetic material forms a generally tubular permanent magnet.

The second magnetic material may be arranged in the charging unit below the second connector. The central passage through the second magnetic material may enable a connection from electrical contacts of the second connector (first and third electrical contacts) to electrical circuitry of the charging unit.

The magnetic north-south polarity of the second magnetic material may be generally aligned with the longitudinal axis of the charging unit. When the first connector is received by the charging unit in close proximity to the second connector, the second magnetic material may magnetise the first magnetic material in the aerosol-generating device, and the magnetic attraction between the first magnetic material and the second magnetic material may draw the aerosol-generating device along the longitudinal axis towards the second connector and the second magnetic material. This action may facilitate electrical connection of the first and second connectors.

When the first and second connectors are electrically engaged, the magnetic attraction between the first and second magnetic materials may releasably retain the first and second connectors together, in electrical engagement. In other words, the magnetic attraction between the first and second magnetic materials may resist separation of the first and second connectors in the direction of the longitudinal axis. As such, additional force may be required to disengage the first and second connectors.

In other embodiments, one of the permanent magnets of the second magnetic material may have a magnetic north-south polarity oriented in the opposite direction. In other embodiments, the first magnetic material of the aerosol-generating device may be arranged in a similar arrangement to the second magnetic material.

The charging unit may be sized and shaped to facilitate receiving the aerosol-generating device in an easy to use manner. In particular, once received, the charging unit may be configured to reposition the aerosol-generating device into a charging position, such that the complementary charging interfaces are electrically engaged. The aerosol-generating device may be repositioned automatically into the charging position. The user of the charging unit may not need to precisely position the aerosol-generating device in the charging position. The charging position may include a tilt, a predefined radial direction, a rotational orientation, or a combination thereof, for the aerosol-generating device. The charging unit may be configured to reposition the aerosol-generating device into a tilted position for charging. The charging unit may also be configured to reposition the aerosol-generating device to lean in a predefined radial direction for charging. The charging unit may also be configured to reposition the aerosol-generating device into a rotational orientation for charging.

The charging unit may include a body. The body may be described as including a housing or an assembly of housings. The body may extend from a top end portion to a bottom end portion. The top end portion may be open. The bottom end portion may be closed. The body may be formed in the shape of a cup or bowl. For example, the body may enclose a receiving volume except at the top end portion. In general, the aerosol-generating device may be "thrown" into the body for charging. The longitudinal axis of the charging unit may extend through the top end portion and the bottom end portion. In particular, the longitudinal axis may extend through a centre of the top end portion, the bottom end portion, or both the top and bottom end portions.

When the aerosol-generating device is received by, or inserted into, the charging unit, the aerosol-generating device may rest at a tilt relative to the longitudinal axis of the charging unit. For example, the top end portion of the body may define a greater inner width, diameter, or circumference than the bottom end portion of the body. In some embodiments, an inner wall portion of the body may extend between the top end portion and the bottom end portion. The inner wall portion may be tapered from the top end portion to the bottom end portion. The tapered inner wall portion may help bias the aerosol-generating device at the predefined tilt for charging when resting against the tapered inner wall portion.

The top end portion of the body may be sized to receive the elongate aerosol-generating device in a variety of orientations. For example, the aerosol-generating device may be received in more than one tilted position, radial direction, rotational orientation, or a combination thereof. In general, the user may "throw" the aerosol-generating device into the receiving volume of the body without precisely orienting one or more of the tilt, radial direction, rotational orientation of the aerosol-generating device. In some embodiments, the user may charge the aerosol-generating device by simply inserting an appropriate end portion of the aerosol-generating device (having the charging interface) into the receiving volume and dropping the aerosol-generating device into the charging unit.

In some embodiments, the inner wall portion may extend at least partially around the longitudinal axis. The inner wall portion may comprise a conical shape. The inner wall portion may at least partially define the receiving volume of the body. In some embodiments, the receiving volume may be described as a cavity. The receiving volume may be sized to receive the elongate aerosol-generating device for engagement with the charging interface.

The charging unit may be configured to reposition the aerosol-generating device into a preferred, or predefined, radial direction that aligns the first electrical contact with the second electrical contact. In some embodiments, the first biasing element may be configured to cause the aerosol-generating device to rest in the predefined radial direction. In some embodiments, the first biasing element and the third biasing element may be configured to cause the aerosol-generating device to rest in the predefined radial direction. For example, the first biasing element may be positioned on an opposite side of the bottom end portion as the third biasing element, and the first biasing element may attract the second biasing element of the aerosol-generating device, whereas the third biasing element may repel the second biasing element to reposition the aerosol-generating device to lean in the predefined radial direction for charging Additionally, or alternatively, the body may be configured to cause the aerosol-generating device to rest in the predefined radial direction that aligns the first electrical contact with the second electrical contact. For example, one portion of the inner wall may be more tapered than another portion of the inner wall, and the aerosol-generating device may "fall" toward the portion having the grater taper. As a result, the first and second electrical contacts may be electrically engaged when the aerosol-generating device rests in the predefined radial direction.

When the aerosol-generating device is tilted or resting in the predefined radial direction, the device may be described as being off-axis with respect to the longitudinal axis extending through the charging unit. In other words, the longitudinal axis of the charging unit and the central axis of the aerosol-generating device may not be aligned.

The charging interface may be coupled to the bottom end portion of the body. In some embodiments, the charging interface may at least partially form the bottom end portion of the body. For example, the charging interface may form a surface of the bottom end portion of the body.

The charging interface may include a first side portion and a second side portion. The first and second side portions may be positioned opposite one another, in particular, in a radial or lateral direction. In some embodiments, the first side portion may include the first biasing element and the second side portion may include the third biasing element. The predefined radial direction may be aligned with the aerosol-generating device tilting toward the first side portion.

The surface of the bottom end portion of the body may not be orthogonal to the longitudinal axis. In other words, the surface may be tilted to connect to an e-cigarette leaning against the body. In some embodiments, the first side portion may define a first portion of the surface and the second side portion may define a second portion of the surface. One or both surface portions may not be orthogonal to the longitudinal axis. In other words, the surface of the bottom end portion may not be flat. The bottom end portion may include at least two angled surface portions. In some embodiments, one or both surface portions may be used to tilt the aerosol-generating device toward the inner wall portion, to orient the aerosol-generating device in the predefined radial direction, or to both tilt and orient the aerosol-generating device for charging.

In some embodiments, the surface of the bottom end portion may have a cone shape. The first and second side portions may define opposite sides of the cone. The apex of the cone may be positioned between the first and second side portions.

When the aerosol-generating device is properly oriented for charging, a visual indictor coupled to the body of the charging unit may activate. In particular, the visual indicator may activate in response to the first electrical contact electrically engaging the second electrical contact. The visual indicator may be used to indicate the charging status of the aerosol-generating device.

An external power connection may be coupled to electric circuitry of the charging unit. For example, the external power connection may be compatible with USB or micro USB connections. The external power connection may be used to provide power for charging the aerosol-generating device.

The charging unit may include a power storage unit. For example, the charging unit may include a battery. The battery may be used to provide portable power for charging the aerosol-generating device. The battery of the charging unit may be able to store more charge than the battery of the aerosol-generating device.

The body of the charging unit may be formed from a single piece of material or may be formed from multiple pieces of material. In some embodiments, the body includes an inner housing. The inner housing may define the inner wall portion and the receiving volume. The inner housing may include the charging interface, including the first and third biasing elements. The body may include an outer housing, which may at least partially cover the outside of the inner housing. The body may include a lower housing, which may include the external power connection. The inner housing and the top housing may be positioned on the lower housing.

In some embodiments, the charging interfaces may be integrally formed with the respective housings of the aerosol-generating device or the charging unit. In other embodiments, the charging interfaces may be removably coupled to the respective housings. For example, the charging interface of the aerosol-generating device may be contained in a charging plug that may be attached to the housing of the aerosol-generating device.

The charging system will now be described with reference to drawings. A brief description of the drawings is as follows.

Figure 1:
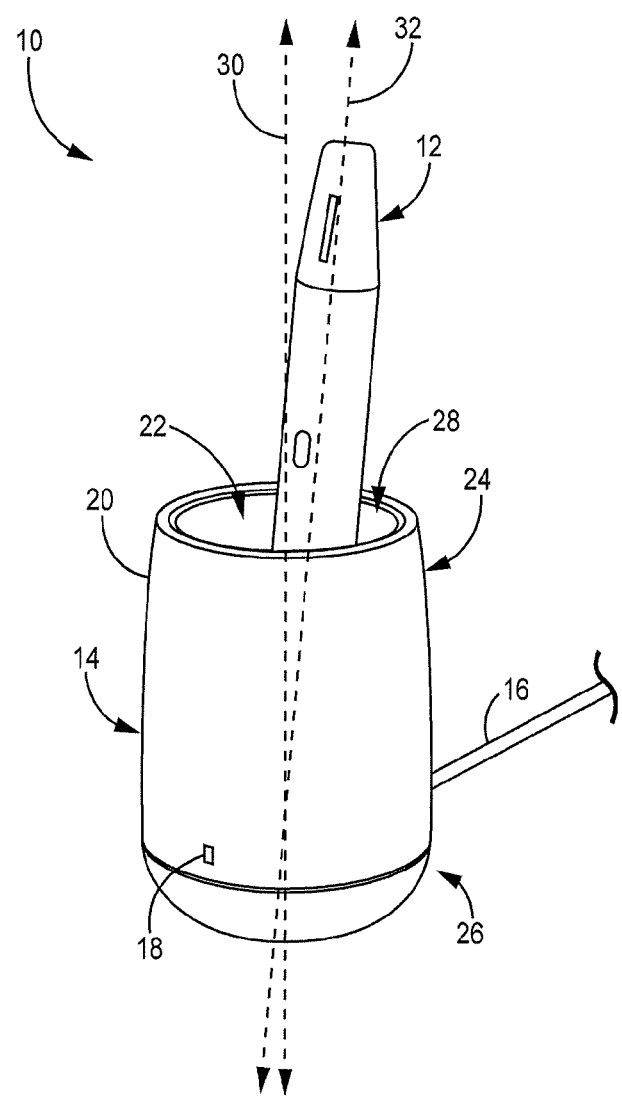
FIG. 1 is a perspective view of one example of the charging system including a charging unit and an aerosol-generating device in a charging position.

The drawings are described in more detail as follows:

FIG. 1 shows charging system 10 including aerosol-generating device 12 and charging unit 14. As illustrated, aerosol-generating device 12 is dropped into, or received by, charging unit 14 in a charging position. Device 12 may include a battery (not shown), which may be recharged by charging unit 14. Power connection 16 may be used to provide electrical power to charging unit 14 for charging device 12. Power connection 16 may connect charging unit 14 to an external power supply, such as an electrical power outlet (not shown). Visual indicator 18 is positioned on a surface of charging unit 14. In particular, visual indicator 18 is positioned on an exterior, or outer, surface of charging unit 14. Visual indicator 18 may be activated when device 12 is being charged by charging unit 14.

Charging unit 14 includes body 20. Body 20 defines receiving volume 22, which may be described as a cavity, for device 12. In particular, an inner wall portion 28 of body 20 may define receiving volume 22. As illustrated, body 20 may be in the shape of a cup or bowl. In general, body 20 is designed to be aesthetically pleasing or decorative. Body 20 and receiving volume 22 extend between top end portion 24 and bottom end portion 26. Device 12 may be inserted through open top end 24 and may be supported by, or rest on, bottom end portion 26 when fully inserted.

Device 12 may be supported by, or lean on, inner wall portion 28 in the charging position. The charging position is tilted relative to longitudinal axis 30 extending through the centre of charging unit 14. In other words, central axis 32 extending through the centre of elongate device 12 is not aligned with longitudinal axis 30.

Figure 2:
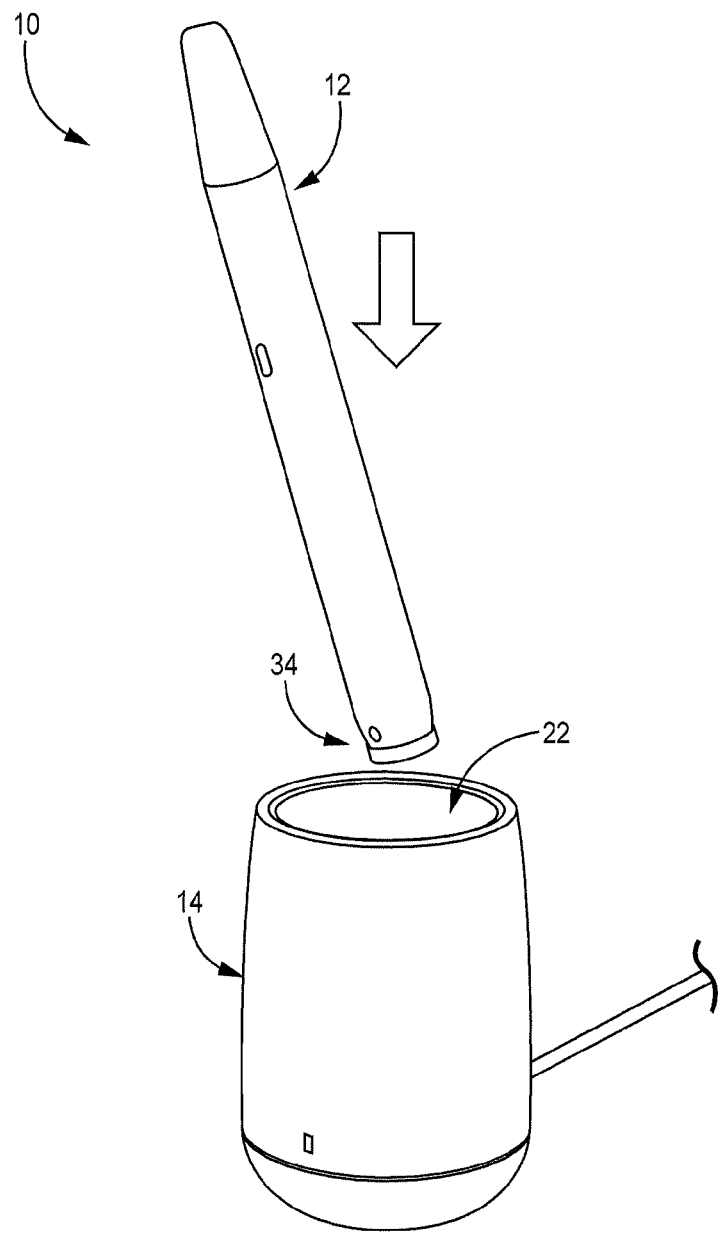
FIG. 2 is a perspective view of the charging system of FIG. 1 with the aerosol-generating device being dropped into the charging unit in a different orientation than the charging position.

FIG. 2 shows charging system 10 with aerosol-generating device 12 being dropped into charging unit 14 in a different orientation than the charging position shown in FIG. 1. A user of charging system 10 may not need to precisely align device 12 into the charging position to charge the device in charging unit 14. The user may simply drop an appropriate end of device 12 into receiving volume 22. In particular, the user may drop a distal end of device 12 having charging interface 34 into receiving volume 22.

Figure 3:
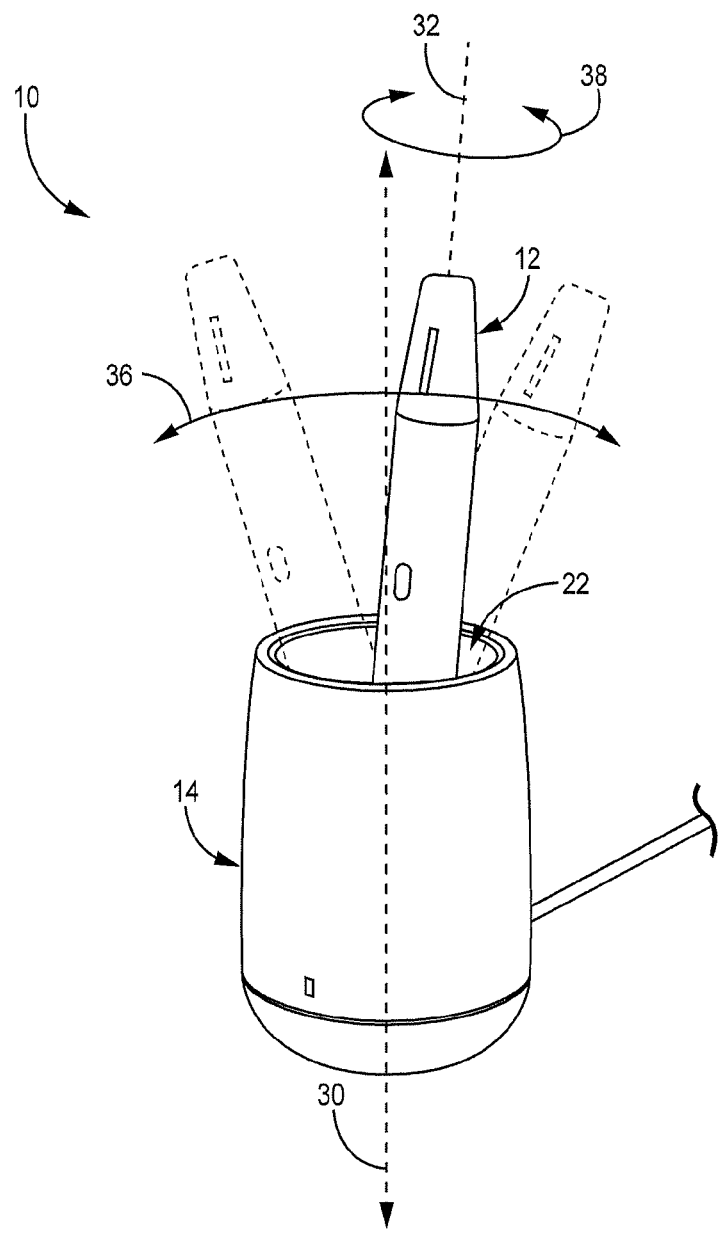
FIG. 3 is a perspective view of the charging system of FIG. 2 automatically repositioning the aerosol-generating device after the aerosol-generating device was dropped into the charging unit.

FIG. 3 shows charging system 10 with aerosol-generating device 12 being automatically repositioned into the charging position. Once device 12 is dropped into receiving volume 22, the device may initially rest at a plurality of orientations. Device 12 may initially rest in a tilted position defined by central axis 32 relative to longitudinal axis 30. As illustrated, device 12 may initially rest in a tilted position in any one of a variety of radial directions 36. Charging unit 14 is configured to reposition device 12 from the various radial directions 36 to one radial direction corresponding to the charging position. Device 12 may also initially rest in any one of a variety of rotational orientations 38. Charging unit 14 may be configured to reposition device 12 from the various rotational orientations 38 to one rotational orientation corresponding to the charging position. In some embodiments, more than one radial direction 36 or rotational orientation 38 may be used in the charging position. The charging position may correspond to one tilted position, or angle defined between axes 30, 32, for device 12. In some embodiments, more than one tilt or angle may be used in the charging position.

Figure 4:
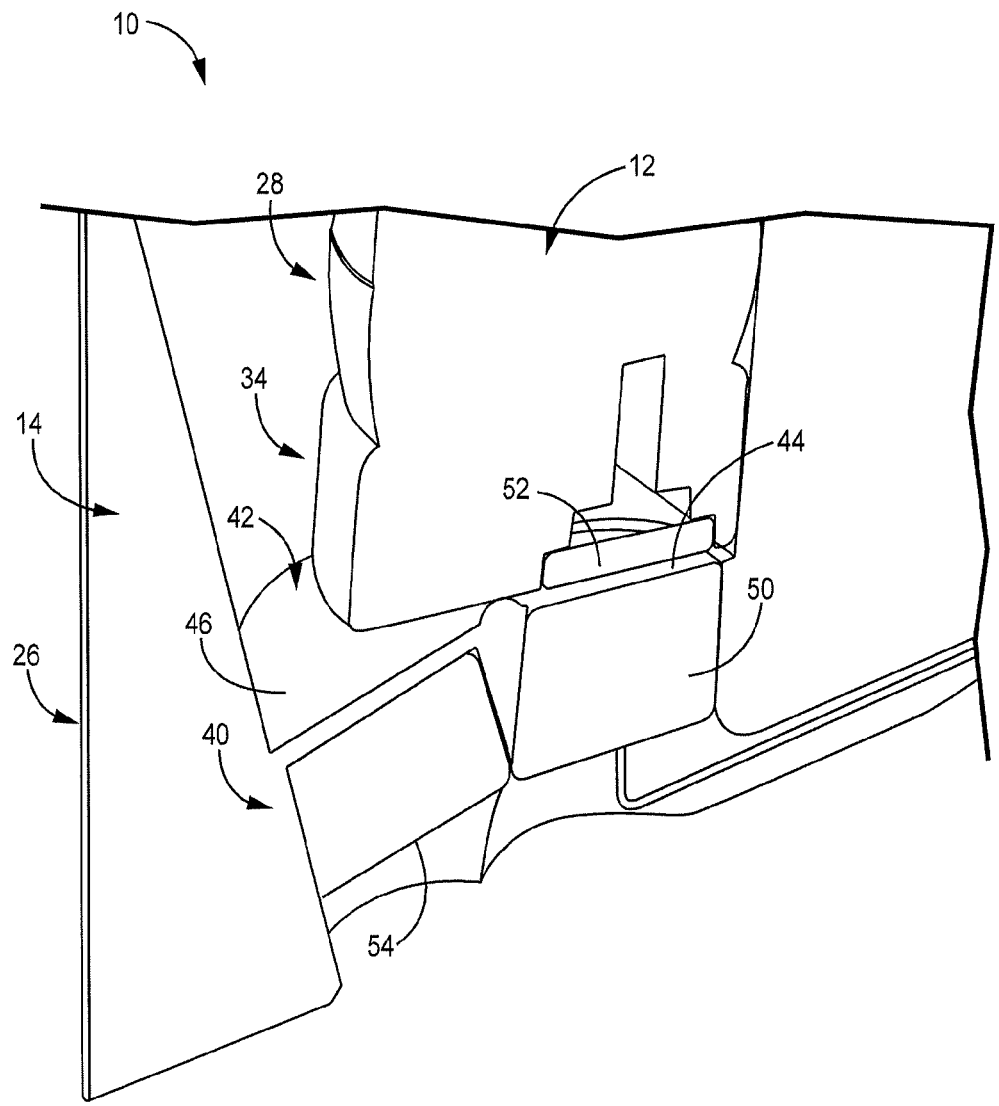
FIG. 4 is a cutaway view of one example of charging interfaces for use with the aerosol-generating device and the charging unit.

FIG. 4 shows charging system 10 with charging interface 34 of aerosol-generating device 12 engaged with charging interface 40 of charging unit 14 in the charging position. As illustrated, in the charging position, device 12 leans against inner wall portion 28 of charging unit 14. Charging interface 40 of charging unit 14 is positioned in bottom end portion 26 of the charging unit. Bottom end portion 26 defines surface 42. Device 12 rests upon surface 42 in the charging position. Surface 42 may include at least first side portion 44 and second side portion 46. Device 12 may be biased to rest upon first side portion 44. Surface 42 may not be orthogonal to the longitudinal axis (FIGS. 1 and 3) of charging unit 14. As illustrated, the surface 42 is tilted to connect to an e-cigarette which leans on an inner surface of the inner wall portion 28 of the body 20. In some embodiments, first side portion 44 and second side portion 46 are not orthogonal to the longitudinal axis.

Charging interface 40 of charging unit 14 may define surface 42. As illustrated, charging interface 40 includes first biasing element 50 and third biasing element 54. Charging interface 34 of device 12 includes second biasing element 52. Using biasing elements 50, 52, 54 may automatically reposition device 12 into the charging position. First biasing element 50 may apply an attracting force upon second biasing element 52. Third biasing element 54 may apply a repelling force upon second biasing element 52. Device 12 may be encouraged to engage with first side portion 44 of surface 42 instead of second side portion 46 in the charging position.

Although not shown, each charging interface 34, 40 includes at least one electrical contact positioned between first and second biasing elements 50, 52. In the charging position, the electrical contacts are electrically engaged. The electrical contacts are used to facilitate contact charging between device 12 and charging unit 14.

Figure 5:
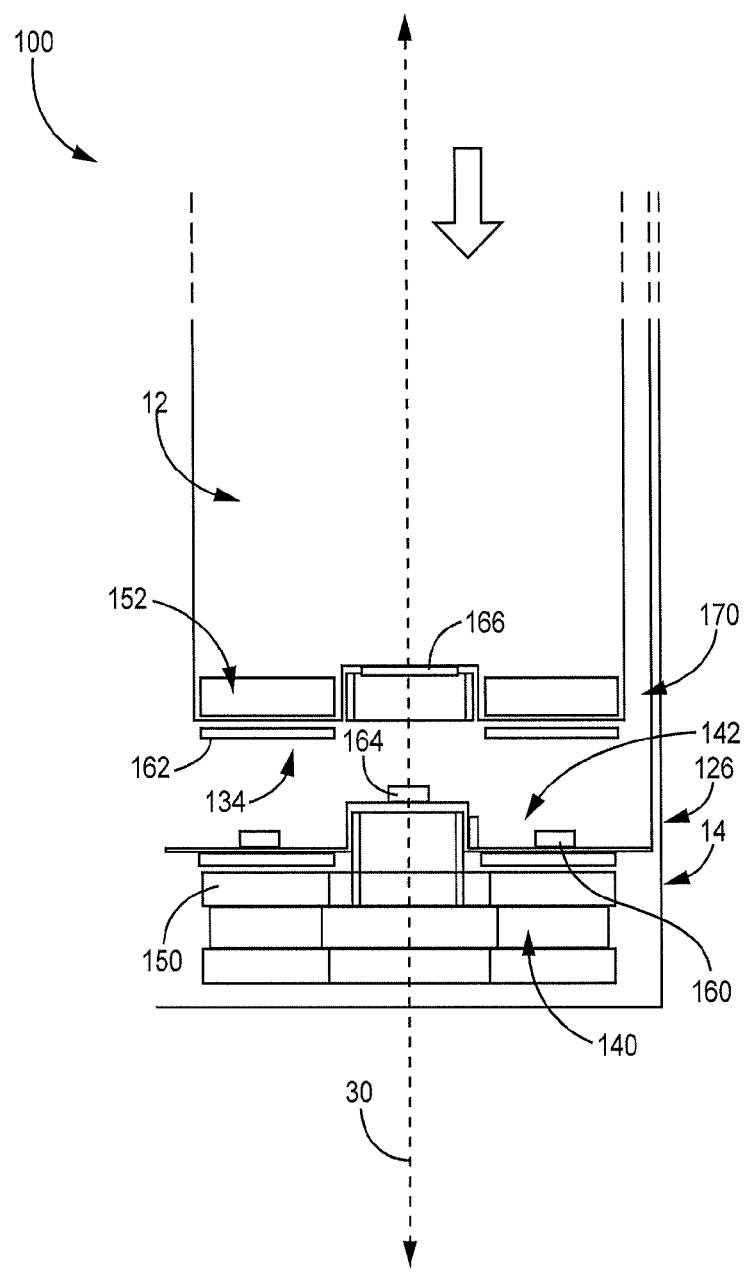
FIG. 5 is a cross-sectional view of another example of charging interfaces for use with the aerosol-generating device and the charging unit.

FIG. 5 shows charging system 100 with charging interface 134 of aerosol-generating device 12 and charging interface 140 of charging unit 14 being moved into the charging position. Charging system 100 is similar to charging system 10 and includes many of the same components, some of which are not described again with respect to system 100 for the sake of brevity. As illustrated, charging unit 14 includes charging interface 140. Charging interface 140 is positioned at bottom end portion 126 of charging unit 14. Charging interface 140 includes first biasing element 150, first electrical contact 160, and third electrical contact 164. Device 12 includes charging interface 134. Charging interface 134 is positioned at an end portion 170 of device 12. Charging interface 134 includes second biasing element 152, second electrical contact 162, and fourth electrical contact 166.

In the illustrated embodiment, first biasing element 150 and second biasing element 152 are each annular shaped. In particular, first biasing element 150 and second biasing element 152 extend at least partially around longitudinal axis 30. First electrical contact 160 is aligned to first biasing element 150. Second electrical contact 162 is aligned to second biasing element 152. First and second biasing elements 150, 152 may be magnets configured to attract one another. Electrical contacts 160, 162 may be electrically engaged in the charging position and retained due to the attraction of biasing elements 150, 152. Third and fourth electrical contacts 164, 166 may also be electrically engaged in the charging position and retained due to the attraction of biasing elements 150, 152. In some embodiments, first and second electrical contacts 160, 162 may be used to provide a charging current and third and fourth electrical contacts 164, 166 may be used to provide a return path. As illustrated, first and third electrical contacts 160, 164 include pogo pins.

Surface 142 of bottom end portion 126 may include more than one portion. First electrical contact 160 may be positioned on surface 142 along an outer portion of bottom end portion 126. Third electrical contact 164 may be positioned on surface 142 along an inner portion of bottom end portion 126. In some embodiments (not shown), the surface 142 may be tilted to connect an e-cigarette which leans on an inner surface of the inner wall portion 28 of the body 20 (FIG. 1).

Figure 6:
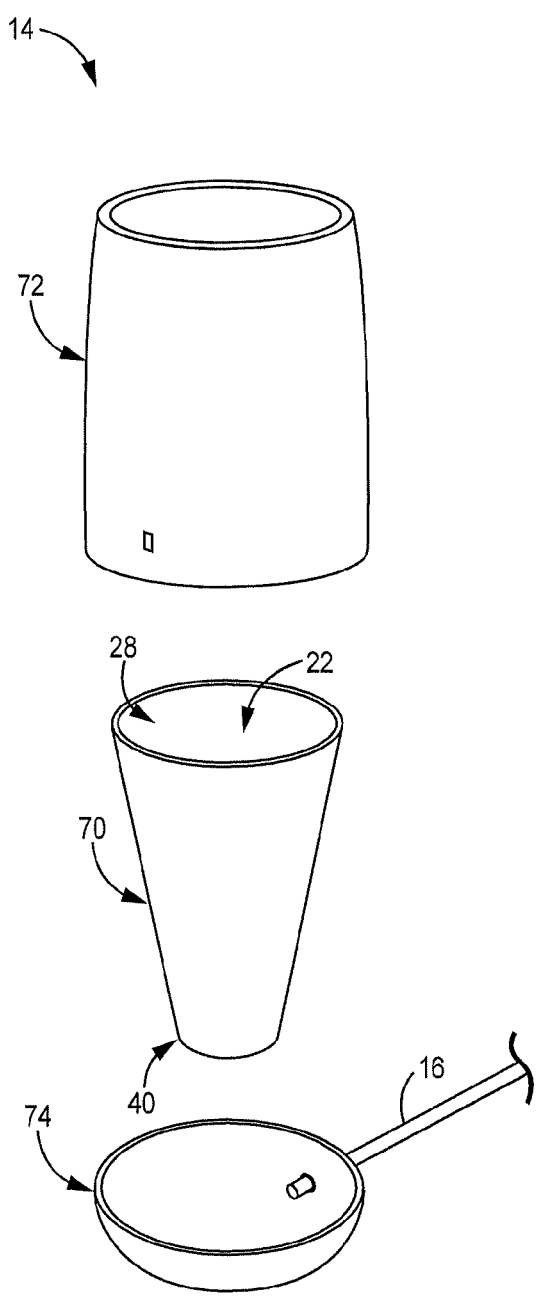
FIG. 6 is an exploded perspective view of the charging unit of FIG. 1.

FIG. 6 shows various components of charging unit 14. As illustrated, charging unit 14 may be formed of multiple housings 70, 72, 74. Inner housing 70 may include inner wall portion 28 used to define receiving volume 22. Charging interface 40 may be positioned at one end of inner housing 70. Outer housing 72 may be positioned around inner housing 70. Lower housing 74 may support both inner housing 70 and outer housing 72. Power connection 16 may be coupled to lower housing 74.

The specific embodiments described above are intended to illustrate the invention. However, other embodiments may be made without departing from the scope of the invention as defined in the claims, and it is to be understood that the specific embodiments described above are not intended to be limiting.

As used herein, the singular forms "a," "an," and "the" encompass embodiments having plural referents, unless the content clearly dictates otherwise.

As used herein, "or" is generally employed in its sense including "and/or" unless the content clearly dictates otherwise. The term "and/or" means one or all the listed elements or a combination of any two or more of the listed elements.

As used herein, "have," "having," "include," "including," "comprise," "comprising" or the like are used in their open-ended sense, and generally mean "including, but not limited to". It will be understood that "consisting essentially of," "consisting of," and the like are subsumed in "comprising," and the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure, including the claims.

The invention claimed is:

1. A charging system for an aerosol-generating device comprising:
    a body at least partially defining a receiving volume, wherein the receiving volume tapers along a longitudinal axis from an open top end portion to a bottom end portion, wherein the receiving volume is sized to receive an elongate aerosol-generating device through the open top end in a plurality of orientations, wherein the body is configured to cause the elongate aerosol-generating device to rest at a predefined tilt relative to the longitudinal axis; and
    a charging interface coupled to the body comprising a first biasing element and a first electrical contact, wherein the first biasing element is configured to apply a force on a second biasing element of the aerosol-generating device that causes a second electrical contact of the aerosol-generating device to electrically engage the first electrical contact when the aerosol-generating device rests on the body at the predefined tilt.

2. The system of claim 1, wherein the first biasing element is configured to attract the second biasing element of the aerosol-generating device.

3. The system of claim 1, wherein the first biasing element is configured to cause the aerosol-generating device to rest in a predefined radial direction that aligns the first electrical contact with the second electrical contact.

4. The system of claim 1, wherein the charging interface further comprises a third biasing element configured to repel the second biasing element of the aerosol-generating device.

5. The system of claim 4, wherein the charging interface defines a surface of the bottom end portion of the body, wherein the charging interface comprises a first radial side portion including the first biasing element and a second radial side portion including the third biasing element.

6. The system of claim 4, wherein at least one of the first biasing element and the third biasing element has an annular shape.

7. The system of claim 1, wherein the first electrical contact comprises a pogo pin.

8. The system of claim 1, wherein the charging interface is coupled to the bottom end portion of the body.

9. The system of claim 1, wherein the biasing elements comprise magnets.

10. The system of claim 1, wherein the body is configured to cause the aerosol-generating device to rest in a predefined radial direction that aligns the first electrical contact with the second electrical contact.

11. The system of claim 10, wherein the bottom end portion of the body defines a surface that is not orthogonal to the longitudinal axis.

12. The system of claim 10, wherein the bottom end portion of the body comprises a conical shape.

13. The system of claim 1, further comprising a visual indicator that activates in response to the first electrical contact electrically engaging the second electrical contact.

14. The system of claim 1, further comprising the aerosol-generating device having the second electrical contact and the second biasing element, wherein the second electrical contact is configured to electrically engage with the first electrical contact in any rotational orientation.

15. The system of claim 1, further comprising the aerosol-generating device having the second electrical contact and the second biasing element, wherein the second electrical contact is not aligned to a central axis extending along the elongate aerosol-generating device.

* * * * *